United States Patent
Hagimoto et al.

(10) Patent No.: US 10,213,832 B2
(45) Date of Patent: Feb. 26, 2019

(54) SINTERED MEMBER, PINION GEAR FOR STARTERS, AND PRODUCTION METHOD THEREFOR

(71) Applicant: Hitachi Chemical Company, Ltd., Tokyo (JP)

(72) Inventors: Go Hagimoto, Matsudo (JP); Tomoyuki Kohida, Matsudo (JP); Katsuhiko Ueda, Matsudo (JP); Kenzo Morita, Matsudo (JP); Shuichi Aoki, Ota (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 1012 days.

(21) Appl. No.: 14/388,659

(22) PCT Filed: Mar. 11, 2013

(86) PCT No.: PCT/JP2013/056666
§ 371 (c)(1),
(2) Date: Sep. 26, 2014

(87) PCT Pub. No.: WO2013/146217
PCT Pub. Date: Oct. 3, 2013

(65) Prior Publication Data
US 2015/0053037 A1 Feb. 26, 2015

(30) Foreign Application Priority Data
Mar. 28, 2012 (JP) .................................. 2012-073379

(51) Int. Cl.
*B22F 3/12* (2006.01)
*B22F 3/17* (2006.01)
(Continued)

(52) U.S. Cl.
CPC .................. *B22F 3/12* (2013.01); *B22F 3/17* (2013.01); *B22F 3/24* (2013.01); *B22F 5/08* (2013.01);
(Continued)

(58) Field of Classification Search
CPC .................. B22F 5/08; B22F 2003/241; B22F 2003/248; B22F 3/12; B22F 3/17;
(Continued)

(56) References Cited

U.S. PATENT DOCUMENTS

| | | |
|---|---|---|
| 5,754,937 A | 5/1998 | Jones et al. |
| 2003/0215349 A1 | 11/2003 | Nakamura et al. |
| 2004/0177719 A1* | 9/2004 | Kosco ..................... B22F 3/164 75/246 |

FOREIGN PATENT DOCUMENTS

| | | |
|---|---|---|
| JP | A-58-019412 | 2/1983 |
| JP | A-05-009508 | 1/1993 |

(Continued)

OTHER PUBLICATIONS

Satyendra. "Carburizing Process and Carburizing Steels." Ispat Digest, Sep. 3, 2014, ispatguru.com/carburizing-process-and-carburizing-steels/. (Year: 2014).*

(Continued)

*Primary Examiner* — Colleen P Dunn
(74) *Attorney, Agent, or Firm* — Oliff PLC (57) ABSTRACT

The present invention provides a sintered body and a production method therefor in which effects of pores remaining at a surface of the sintered body can be avoided without removing the pores by machining and plastic working, thereby obtaining strength equivalent to that of ingot materials. The sintered member comprises: a hardness distribution in which hardness contiguously varies from a surface to an inner portion; a Vickers hardness value of 730 or less at (Continued)

the surface; the maximum hardness of which portion exists in a region of 150 to 300 μm from the surface; wherein the maximum hardness is a Vickers hardness value of 600 or more.

9 Claims, 6 Drawing Sheets (51) Int. Cl.
    *B22F 3/24*     (2006.01)
    *B22F 5/08*     (2006.01)
    *C22C 38/04*     (2006.01)
    *C22C 38/08*     (2006.01)
    *C22C 38/12*     (2006.01)
    *C22C 38/22*     (2006.01)
    *C22C 33/02*     (2006.01)
    *F16H 55/06*     (2006.01)

(52) U.S. Cl.
    CPC .......... *C22C 33/0207* (2013.01); *C22C 38/04* (2013.01); *C22C 38/08* (2013.01); *C22C 38/12* (2013.01); *C22C 38/22* (2013.01); *B22F 2003/241* (2013.01); *B22F 2003/248* (2013.01); *F16H 55/06* (2013.01); *Y10T 74/19963* (2015.01)

(58) Field of Classification Search
    CPC ....... B22F 3/24; C22C 33/0207; C22C 38/04; C22C 38/08; C22C 38/12; C22C 38/22; F16H 55/06; Y01T 74/19963
    See application file for complete search history.

(56) References Cited

FOREIGN PATENT DOCUMENTS

| | | |
|---|---|---|
| JP | A-2001-513143 | 8/2001 |
| JP | A-2003-253372 | 9/2003 |
| JP | A-2006-037979 | 2/2006 |
| JP | A-2012-255183 | 12/2012 |

OTHER PUBLICATIONS

Apr. 16, 2013 International Search Report issued in International Application No. PCT/JP2013/056666.

* cited by examiner

SINTERED MEMBER, PINION GEAR FOR STARTERS, AND PRODUCTION METHOD THEREFOR

TECHNICAL FIELD

The present invention relates to a sintered member, a pinion gear for starters, and production method therefor, and it specifically relates to a technique for obtaining high strength equivalent to that of an ingot material by forging.

BACKGROUND ART

Powder metallurgy is a technique in which a raw material consisting of a metallic powder is compacted to have predetermined shape and size, and this is then sintered by heating to a temperature not causing melting, thereby strongly bonding the powder particles to each other, and this has advantages in that a near-net shape can be formed, it is suitable for mass production, special materials which cannot be made of the ingot material can be produced, or the like, and it can be applied to machine parts for automobiles and machine parts for various industries.

Sintered members generally have lower strength than ingot materials since gaps are formed between powder particles when a raw powder is compacted and remain as pores after sintering. For example, speed reduction starters are widely used as engine starting devices for automobiles. The speed reduction starter includes a speed reduction device having an internal gear and a planetary gear to reduce revolution speed of a motor, and includes a pinion gear that is connected to an output shaft of the speed reduction device and is engaged with a ring gear of the engine, whereby the engine is started. In the starter, sintered parts are applied to internal reduction gear parts such as an internal gear and a planetary gear; however, application of sintered parts to the pinion gear have been deferred since sintered parts do not have sufficient strength for the pinion gear, to which a load of up to six times may be applied compared to that of internal reduction gear parts.

This problem has been addressed by strengthening a matrix by adding a large amount of alloying elements to a sintered member, that is, it has been addressed by making higher grade steel than that of ingot materials. However, there is a limit to the strengthening of the matrix by alloying, and the cost of raw materials increases as the prices of alloy elements increase.

On the other hand, strengthening the matrix of the sintered member by reducing number of pores or disappearing pores has been investigated. A liquid phase sintering method is a technique in which an element which generates a liquid phase in sintering is added, whereby pores are filled with the liquid phase and disappear; however, it is difficult to ensure dimensional accuracy, whereby machining is required after sintering, and the advantage of powder metallurgy, in which a near-net shaped body can be formed, is reduced. A powder forging method in which a raw material powder is heated and forged in a heated die set or a sinter forging method in which a raw material formed by compacting and sintering through powder metallurgy is hot forged require heating apparatuses for heating the raw material powder and the die set or sintered compact, whereby the producing cost may increase.

In such circumstances, sintering and cold forging methods, in which a raw material formed by compacting and sintering through powder metallurgy is cold forged, thereby obtaining high density, has been researched (Patent Publications 1 and 2). A member produced by the sintering and cold forging method is often subjected to carburizing and quenching to obtain hardness and strength as the member as well as mechanical parts made from ingot materials. That is, if hardness of a mechanical part is uniformly increased, toughness is decreased. Therefore, carburizing and quenching are widely used as methods for improving toughness by maintaining the hardness of the inner portion low to a certain extent, as well as improving wear resistance and fatigue strength with respect to repeated surface pressure by hardening only the surface that slides with a counter member and is subjected repeatedly to surface pressure.

In carburizing and quenching, a heat treatment object is exposed to a carburizing gas atmosphere having a Cp (carbon potential, which is carbon concentration [mass %] in the atmosphere gas) which is higher than the carbon content of the matrix at a temperature which is approximately 100° C. higher than the austenite transformation temperature, whereby carbon is diffused from the gas atmosphere into the heat treatment object and required carburized layer is formed, then the heat treatment object is dipped into an oil, etc., and is rapidly cooled and quenched, thereby forming a hard matrix such as martensite and bainite. Then, the heat treatment object is subjected to tempering at a temperature of about 200° C. for a suitable time to improve toughness. In such a generic hardening method, the thickness of the carburized and hardened layer having a Vickers hardness value of 550 or more can be adjusted by increasing the quenching time. In this case, the distribution of hardness is such that the hardness of the outermost layer is highest and the hardness gradually decreases toward the inner portion.

Patent Publication 1 is Japanese Unexamined Patent Application Publication No. 2003-253372.

Patent Publication 2 is Japanese Unexamined Patent Application Publication No. 2001-513143.

DISCLOSURE OF THE INVENTION

Problems Solved by the Invention

Although the maximum density in the sintering and cold forging method approaches the true density with the increase in forging pressure, the amount of pores remaining is about 1 to 2 volume % under the pressures used in industrial production. Although the volume of pores remaining on the surface is reduced by the pressure, pores exist with the same frequency as in the inner portion. The depth of pores remaining on the surface reaches about 70 μm. On the other hand, the surface roughness of a sintered body is limited to 1 to 2 jam, whereby the shape of pores is sharp. When the sintered body that was cold forged and has sharp pores at its surface is quenched, although the surface layer is hardened, notch sensitivity increases. As a result, sharp pores remaining on the surface of the sintered body which was cold forged function as a notch, and stress is concentrated at the notch, thereby decreasing bending workability and impact value.

In order to avoid such disadvantages, a surface of a material is machined before quenching and pores remaining in the surface layer are removed, or alternatively, the surface layer is subjected to plastic flow and remaining pores are filled and disappear, thereby rendering pores harmless, whereby mechanical properties corresponding to a density of forged body can be obtained. However, when a machining step or a plastic working step is added after cold forging, production cost increases.

Therefore, it is an object of the present invention to provide a sintered body and production method therefor in which harmful effect of pores remaining on a surface of the sintered body can be avoided without performing removal of pores by a machining step and a plastic working step, thereby obtaining strength equivalent to ingot materials and being applicable to pinion gears for starters.

Means for Solving the Problems

The inventors have conducted intensive research to increase the strength of a sintered body that is forged after sintering, and they have discovered a method in which the effect equivalent to rendering remaining pores harmless by machining, can be easily obtained by conditions of carburizing and quenching a forged body. That is, the inventors have found that stress concentration at remaining pores is greatly affected by hardness of a surface, and if hardness of a surface is reduced within a required performance, stress concentration can be avoided, and therefore, even if pores remain at the surface, the effects can be avoided. The inventors have also found that although hardness distribution is such that hardness is greatest at the surface and the hardness gradually decreases toward an inner portion in a conventional carburizing and quenching method, the hardness at the outermost surface can be reduced by adjusting the carbon potential of an atmosphere after the carburizing step.

The present invention is based on the above knowledge, and it provides a sintered member comprising: a hardness distribution in which hardness continuously varies from a surface to an inner portion; a Vickers hardness value (hereinafter referred to as Hv) of 730 or less at the surface; the maximum hardness of which portion exists in a region of 150 to 300 μm from the surface; wherein the maximum hardness is Hv 600 or more.

The present invention provides a production method for a sintered member, the method comprising: a mixing step for mixing a raw material powder; a compacting step for compressing the raw material powder and obtaining a compact; a sintering step for sintering the compact and obtaining a sintered body; a forging step for forging the sintered body and obtaining a forged body; a carburizing step for heating the forged body in a gas atmosphere in which the carbon concentration is 0.7 to 1.2 mass % at a temperature of 850 to 950° C.; a decarburizing step for heating the forged body in a carburizing gas atmosphere in which the carbon concentration is 0.3 to 0.6 mass % at a temperature of 800 to 950° C. after the carburizing step; a quenching step for rapidly cooling the forged body after the decarburizing step; and a tempering step for heating the forged body at a temperature of 150 to 280° C. and cooling the forged body to ordinary temperature after the quenching step. As a method of rapid cooling in the quenching step, several methods such as a method in which a heated forged body is dipped into water or an oil and a method in which air or mist is blown on a forged body, etc., may be applied. The method in which a forged body is dipped into an oil is preferable. The forging step is preferably performed by cold forging.

According to the sintered member of the present invention, since hardness of the surface is reduced, harmful effects caused by pores remaining at a surface after forging is removed, whereby strength equivalent to ingot materials can be obtained, and it can be applied to pinion gears for starters. In the production method for a sintered member, since hardness of a surface can be reduced, strength equivalent to ingot materials can be obtained without addition of a machining step or a plastic working step, and it is useful for industry.

BRIEF DESCRIPTION OF THE DRAWINGS

FIG. 9 is a graph showing a variation of hardness at a portion from a surface when a heating temperature in the carburizing step of the example is varied.

BEST MODE FOR CARRYING OUT THE INVENTION

Figure 1:
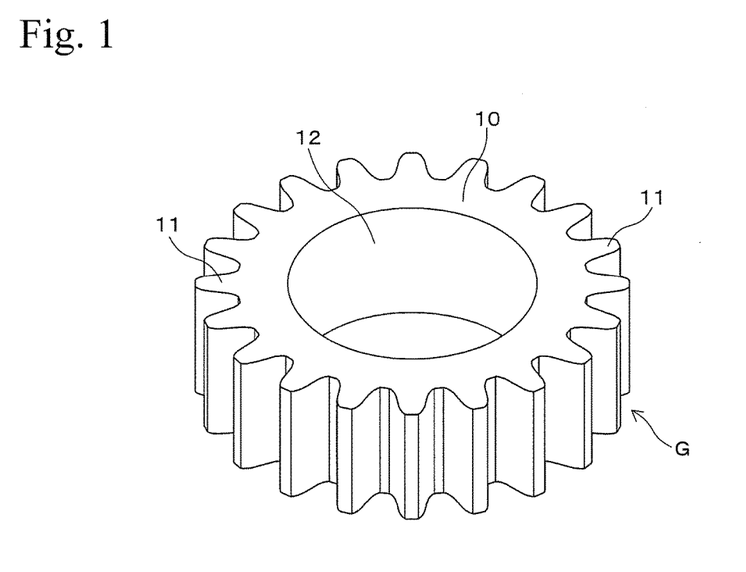
FIG. 1 is perspective view showing an embodiment of a gear that is produced in an embodiment of the present invention.
Figure 2A:
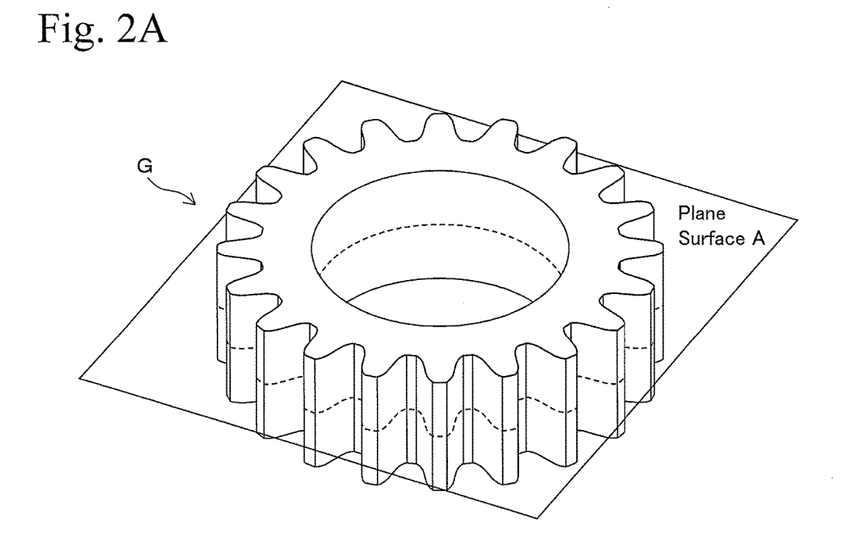
FIGS. 2A and 2B are drawings explaining a measurement portion for obtaining hardness distribution in the embodiment of the present invention.
Figure 2B:
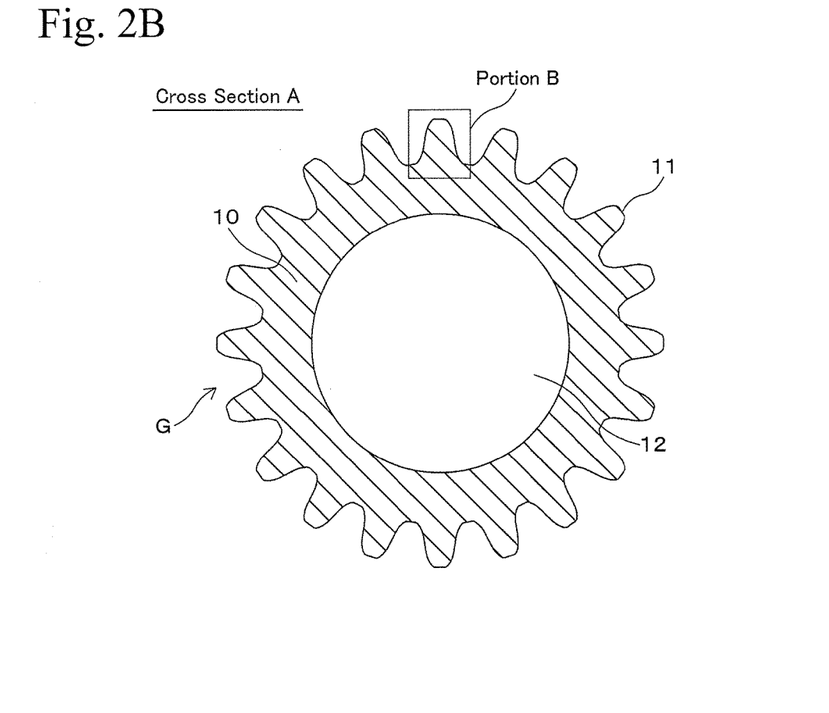

In the following, a cold forged sintered member of an embodiment of the present invention will be explained as an example of application to a spur gear G shown in FIG. 1. The spur gear G shown in FIG. 1 is manufactured such that plural teeth portions 11 projecting radially outward are formed at equal interval at an outer peripheral portion of a spur gear body 10, and a mounting hole 12 is formed at the center portion of the spur gear body 10. The spur gear G is treated such that a compact obtained by compressing a raw material powder is sintered, the compact is cold forged, and it is carburized and quenched and tempered under conventional conditions. FIG. 2B shows a cross section of the spur gear G taken along a plane surface A perpendicular to the mounting hole 12 of the spur gear G as shown in FIG. 2A.

Figure 3A:
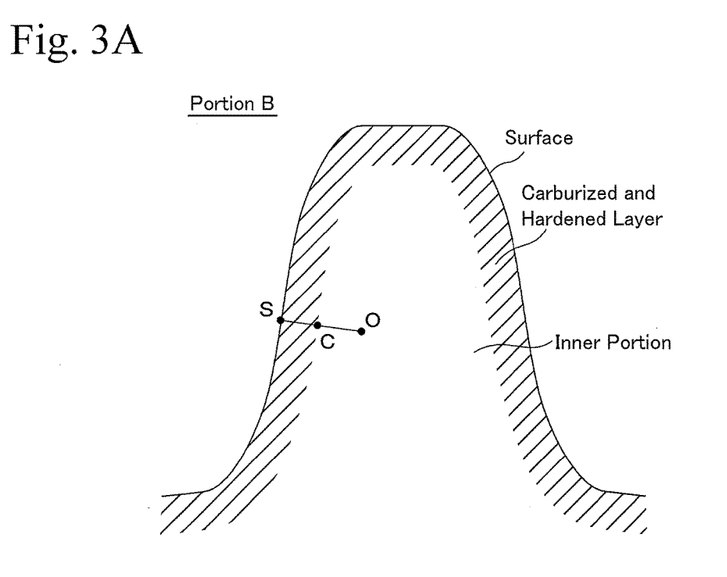
FIGS. 3A and 3B are drawings showing hardness distribution in a conventional sintered gear that was subjected to cold forging and carburizing and quenching.
Figure 3B:
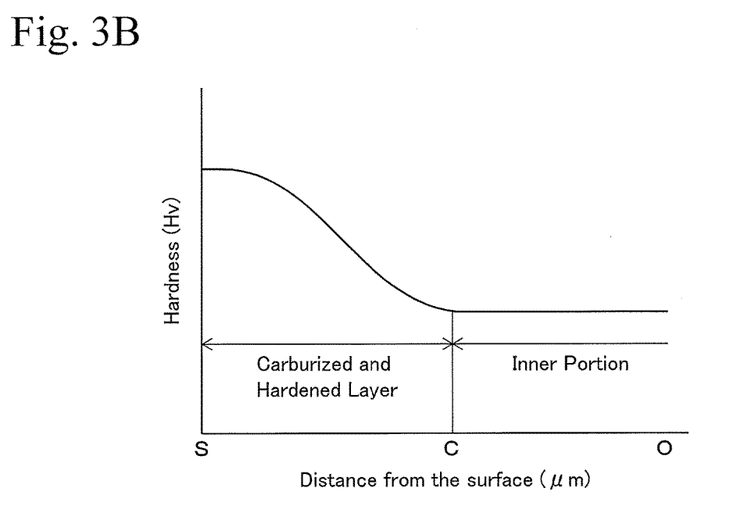

In conventional carburizing and quenching, a cold forged sintered member is subjected to a carburizing step in which the sintered member is heated and held at a temperature of 850 to 950° C. in a carburizing gas atmosphere of which carbon concentration in the atmosphere is 0.7 to 1.2 mass %, and is quenched by a quenching step in which the sintered member is rapidly cooled by dipping it into an oil. In the conventional cold forged sintered gear obtained by such a process, carbon is provided from the atmosphere gas to an austenitic surface and diffuses into an inner portion, whereby the hardness distribution of the tooth portion shown as the B portion in FIG. 2B is shown in FIGS. 3A and 3B. That is, the hardness distribution of the tooth portion from the surface S to the inner portion O in the cold forged sintered gear is such that, as shown in FIG. 3B, the hardness continuously varies from the surface S to the inner portion O, the carburized hardening-layer (S-C) having a hardness greater than the inner portion is formed in a region C from the surface S and to a depth (distance from S) C. In the carburized hardening-layer, the surface S has a carbon content equal to the carbon concentration in the atmosphere gas and the highest hardness, and a hardness distribution in which the hardness gradually decreases since the amount of carbon distribution gradually decreases from the surface S to the depth C toward an inner portion.

Figure 4A:
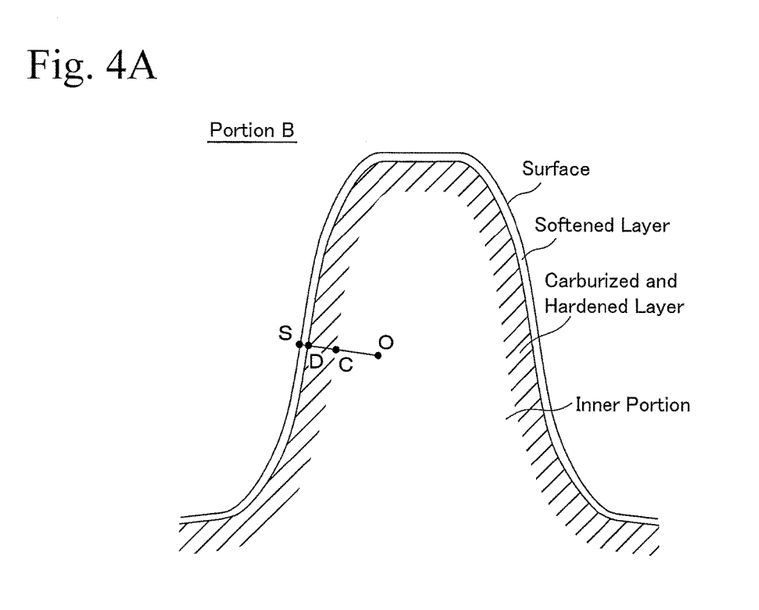
FIGS. 4A and 4B are drawings showing hardness distribution in a sintered gear of the present invention which was subjected to cold forging and carburizing and quenching.
Figure 4B:
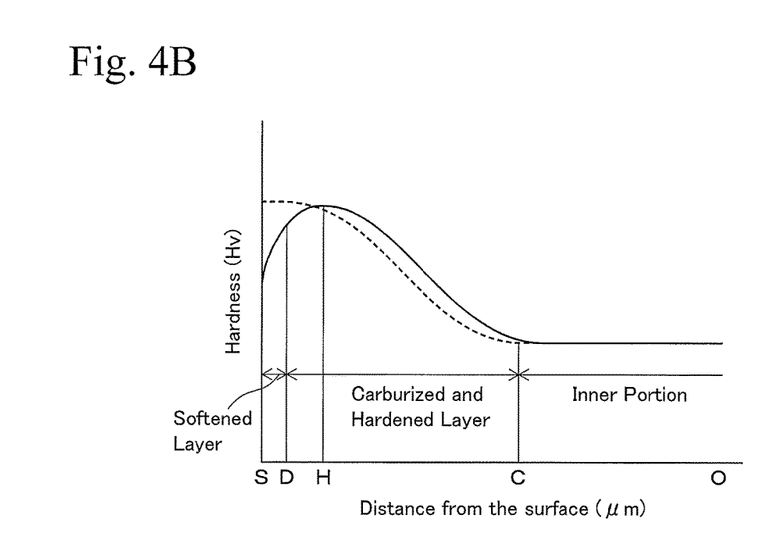

On the other hand, when a cold forged sintered member of the embodiment of the present invention is applied to the spur gear G, an example of a hardness distribution of the tooth portion shown as the B portion in FIG. 2B is shown in FIGS. 4A and 4B. In the diagram of a hardness distribution from the surface in FIG. 4B, the solid line shows an example of a hardness distribution of a cold forged sintered member of the present invention, and the broken line shows an example of a hardness distribution shown in FIG. 3B in the conventional cold forged sintered member. In the cold forged sintered member of the present invention (solid line), a softened layer (S-D) is formed in a region from the surface S of the tooth portion to a depth (distance from the surface) D, and a carburized hardening-layer (D-C) is formed inside the softened layer. In the hardness distribution from the softened layer (S-D), through the carburized hardening-layer (D-C), to the inner portion O, the hardness continuously varies from the surface to the inner portion, wherein the hardness of the carburized hardening-layer is maximum at the depth (distance from the surface) H, and the hardness of the surface is less than the hardness at the depth (distance from the surface) H. In the cold forged sintered member of the present invention, since the softened layer (S-D) is provided in the surface layer, notch sensitivity of remaining pores functioning as notches is reduced, and stress concentration at the remaining pores is inhibited. It should be noted that the softened layer is formed by adjusting the amount of carburizing in the surface and the inner portion as mentioned above, it does not cause harmful effects such as an abnormal oxidized layer, etc.

The hardness of the surface S of the cold forged sintered member is not greater than Hv 730 to reduce the notch sensitivity. The lower limit of the hardness of the surface of the cold forged sintered member is not limited. The lower limit differs according to the material of the cold forged sintered member, and it may be a hardness of the material that does not contain C (a material that was not heat treated). If the hardness of the surface S is too low, wear resistance is decreased and wear easily occurs when the member is used as, for example, gears, with which a counter part is brought into contact and slides. Therefore, if the member is used in the above uses, the hardness of the surface S of the cold forged sintered member is preferably Hv 500 or more, and it is more preferably Hv 600 or more.

The softened layer is formed in not only the surface of the cold forged sintered member, but also in a surface of pores which remain and are open at the surface, whereby there is no need to form the softened layer beyond the depth of remaining pores. However, if the depth D of the softened layer is greater than the depth of the remaining pores, the effect of reducing notch sensitivity is reliably obtained. In this case, the depth of the remaining pores at the surface reaches about 70 μm, whereby the depth of the softened layer is preferably 100 μm or more. It should be noted that the depth D of the softened layer is the depth of the region at which hardness is Hv 730 or less from the surface.

In a case in which repeated surface pressure will be applied to a member such as a gear, the stress (Hertzian stress) may be maximum in a region 150 to 300 μm from the surface. Therefore, in order to improve fatigue strength with respect to repeatedly applied surface pressure, the hardness is maximum in the region of 150 to 300 μm from the surface, and the hardness is Hv 600 or more.

The cold forged sintered member having the above hardness distribution can be easily obtained by providing a decarburizing step between the carburizing step and the quenching step. That is, in the carburizing step, the cold forged sintered member as a heat treatment object is heated to a temperature higher than the austenite transformation temperature and exposed to a carburizing gas atmosphere in which the carbon concentration is 0.7 to 1.2 mass %, thereby being carburized. The surface of the cold forged sintered member has a carbon content corresponding to the carbon concentration (0.7 to 1.2 mass %) of the atmosphere gas. If the carbon concentration of the atmosphere gas is reduced and maintained for a suitable time, carbon concentrated in the surface layer disperses and penetrates into the inner portion, and carbon which is solid solved in a matrix is discharged from the surface into the atmosphere gas, whereby the surface layer is decarburized and the softened layer is formed in the surface layer, and the depth of the hardening layer is increased. Therefore, the hardness of the notch is reduced and stress concentration to the notch is solved, whereby product strength corresponding to the density of the cold forged sintered member can be obtained.

If the carbon concentration of the atmosphere is greater than 0.6% in the decarburizing step, the amount of carbon discharged from the surface is insufficient, whereby it is difficult to reduce the surface hardness to be Hv 730 or less. On the other hand, if the carbon concentration of the atmosphere in the decarburizing step is less than 0.3%, the amount of carbon discharged from the surface is excessive, whereby the hardness in the region of 150 to 300 μm from the surface may be less than Hv 600. Therefore, the carbon concentration of the atmosphere gas in the decarburizing step is 0.3 to 0.6 mass %.

Diffusion of carbon and decarburization is promoted when the temperature is high. Therefore, if the temperature is less than 800° C., the decarburization is not promoted, whereby an extremely long time is required to obtain a desired hardness in the cold forged sintered member or a desired hardness cannot be obtained. On the other hand, if the temperature is greater than 950° C., decarburization is excessively promoted and the hardness of the inner portion is easily decreased. Therefore, the decarburizing step is performed at a temperature of 800 to 950° C.

The carburizing step performed before the decarburizing step may be in a conventional manner, and the carbon concentration of the atmosphere gas is 0.7 to 1.2 mass % as mentioned above. That is, if the carbon concentration of the atmosphere gas is less than 0.7 mass %, the amount of carburizing is insufficient, whereby wear resistance and strength cannot be improved. On the other hand, if the carbon concentration of the atmosphere gas is greater than 1.2 mass %, the amount of carburizing is excessive, whereby brittle cementite is easily precipitated in the matrix.

If the heating temperature in the carburizing step is less than 850° C., diffusion of carbon from the atmosphere gas into the cold forged sintered member is insufficient. If the heating temperature in the carburizing step is more than 950° C., diffusion of carbon from the atmosphere gas into the cold forged sintered member is excessive, and carbon diffuses into the inner portion of the cold forged sintered member, whereby toughness of the cold forged sintered member is deteriorated. Therefore, the carburizing step is performed at a temperature of 850 to 950° C.

After carbon distribution of the cold forged sintered member as a heat treatment object is adjusted in the above manner, the cold forged sintered member is dipped into an oil, etc., and rapidly cooled, thereby being quenched. In this case, oversaturated carbon in the portion with high carbon content is forced to be solid solved, and the hardness is increased. In the decarburized layer in the surface and inside thereof, the carbon content is lower than that portion, whereby the hardness is low. Thus, the cold forged sintered member having the above hardness distribution is obtained.

In the cold forged sintered member which was subjected to quenching treatment, strain is excessively accumulated at a portion having high carbon content, and the portion has a hard and brittle metallic structure. Therefore, as conventionally performed, the cold forged sintered member which was quenched is subjected to a tempering step in which it is heated again at a temperature of 150 to 280° C. and cooled to ordinary temperature. By performing such a tempering step after the quenching step, oversaturated carbon precipitates as ε carbide ($Fe_2C$) from martensite transformed in the quenching treatment, thereby forming low carbon martensite. Therefore, the strain formed by the quenching treatment is removed without decreasing hardness of the cold forged sintered member. In this case, if the heating temperature in the tempering is less than 150° C., removal of the strain is insufficient. If the heating temperature in the tempering is greater than 280° C., the low carbon martensite is easily dissolved to ferrite and two-dimensional cementite, thereby decreasing the hardness.

The decarburizing step may be performed such that the heating temperature of a heat treatment object in the carburizing step is maintained and only the carbon concentration of the atmosphere gas is adjusted, and the decarburizing step is performed sequentially after the carburizing step, then, the quenching step is performed. The heating temperature in the carburizing step is preferably, for example, 900 to 950° C., thereby promoting carburizing of the heat treatment object, and the heating temperature in the decarburizing step is preferably 800 to 870° C., thereby precisely controlling the decarburizing. By performing the carburizing step and the decarburizing step, the carbon distribution of the cold forged sintered member can easily be a required condition, and the hardness distribution of the cold forged sintered member after the quenching treatment can easily be a required condition. In this case, since the quenching is performed at a temperature of 800 to 870° C., the amount of strain accumulated in the heat treatment object can be reduced compared to the case in which quenching is performed at a temperature of 900 to 950° C., whereby variation of dimensions caused by the strain can be inhibited to be low.

The above example is an example in which a heat treatment object is heated in a heat treatment furnace while the carbon concentration in the atmosphere gas and the heating temperature are changed as the heat treatment progresses. When it is difficult to change a carbon concentration in an atmosphere gas and a heating temperature in a heat treatment furnace, or these changes are not preferable for a production line, after performing the carburizing step, the cold forged sintered body is once cooled, and the sintered body may be heated again and be decarburized. In this case, quenching treatment can be performed after the carburizing step since the heat treatment object is heated to a temperature higher than the austenite transformation temperature in the following decarburizing step. In this case, quenching treatment is again performed after the decarburizing step. In such a case in which the carburizing step and the decarburizing step are performed in an individual heating furnace, the carburizing step can be performed with other general sintered members that are not subjected to the decarburizing step. In this case, only the cold forged sintered member may be subjected to the decarburizing step, and the process can be set according to the circumstances of a production floor.

Ferrous sintered materials for various kinds of machine structural members which have been used can be used as raw materials of sintered bodies. For example, SMF2 type (iron-copper type), SMF3 type (iron-carbon type), SMF4 type (iron-copper-carbon type), SMF5 type (iron-nickel-copper-carbon) type, SMF6 type (iron-copper-carbon type), SMF7 type (iron-nickel type), and SMF8 type (iron-nickel-carbon type) which are regulated by Z2550 of the Japanese Industrial Standard and 4100 type (iron-chromium-manganese type) and 4600 type (iron-nickel-molybdenum type) which are regulated by the American Iron and Steel Institute (AISI) Standard.

In such ferrous sintered materials, the carbon content is preferably 0.6 mass % or less to be easily deformed and densified in the forging. In a case in which the carbon content is required to be more than 0.6 mass % as a product, heat treatment is preferably performed in a carburizing atmosphere after forging, thereby compensating for any shortfall in the amount of C. Alternatively, spheroidizing annealing may be performed before the forging, and the matrix of the sintered material made be easily plastically deformed.

As a raw material powder used, iron powders, simple powders of several kinds of alloying elements, raw materials mixed with a graphite powder, etc., iron based alloy powders alloyed with several kinds of alloying elements, raw material powders mixed with the iron based alloy powders, simple powders of several kinds of alloying elements, and graphite powders, etc., may be used in the present invention. When 4600 type regulated by the American Iron and Steel Institute (AISI) Standard as a sintered material is used, a raw material powder mixed with an iron alloy powder consisting of, for example, by mass %, 0.4 to 1.0% of Ni, 0.2 to 1.0% of Mo, 0.1 to 0.5% of Mn, the balance of Fe and inevitable impurities, and 0.2 to 0.6% of a graphite powder. When the 4100 type regulated by the American Iron and Steel Institute (AISI) Standard as a sintered material is used, a raw material powder mixed with an iron alloy powder consisting of, for example, by mass %, 0.4 to 1.0% of Cr, 0.2 to 1.0% of Mo, 0.1 to 0.8% of Mn, the balance of Fe and inevitable impurities, and 0.2 to 0.6% of a graphite powder.

The compacting step is a step for compressing the raw material powder and obtaining a compact and is the same as a forming step by an ordinary pressing process. That is, a die hole of a die used in an ordinary pressing process is filled with a raw material, which is compressed by upper and lower punches, and the compressed compact is extracted from the die hole, whereby a compact is obtained having smaller radial size and larger thickness than those of the spur gear G shown in FIG. 1. The density of the compact is 7.0 Mg/m³ or more.

The sintering step can be performed under ordinary conditions for conventional powder metallurgy processes. If a sintered body as a raw material is oxidized in the sintering step, the sintered body is hardened and is not easy to plastically deform. Therefore, the sintering atmosphere is preferably an ordinary non-oxidizing atmosphere such as nitrogen gas or a mixed gas of nitrogen and hydrogen, and the like, or a vacuum atmosphere. The sintering temperature may be about 1000 to 1250° C.

The forging step is a step in which the sintered body as a raw material obtained by the sintering step is preferably cold-forged and performed such that a cold forging die having a die hole which has the same shape as the spur gear G shown in FIG. 1 is prepared, a lubricant such as zinc stearate, and the like, is coated on a surface of the die hole or the sintered body, the sintered body is inserted into the die hole of the cold forging die, and the sintered body is compressed by punches from the vertical direction at a pressure of 1500 to 2500 MPa. Then, the forged body is extracted from the die hole, thereby obtaining a cold forged sintered member. The compressing ratio (compressed thickness/original thickness) may be 8.1 to 9.3%. The density of the cold forged sintered member may be 7.7 Mg/m$^3$ or more, and the density ratio may be 97.8% or more. In the present invention, the forging is preferably cold forging, which does not require heating of the sintered body, but hot forging and warm forging may also be performed.

The cold forged sintered member as a heat treatment object obtained through the mixing step for mixing the above raw material powder, the compacting step, sintering step, and forging step, is subjected to the carburizing step and the decarburizing step, and subjected to the tempering step, thereby obtaining a cold forged sintered member having the above hardness distribution. In the production method, remaining pores in the cold forged sintered member are not removed by a machining step or a plastic working step. In the method, since pores are inhibited from functioning as notches in a condition in which pores remain at a surface of the cold forged sintered member, a machining step and a plastic working step after the forging are not necessary, and cold forged sintered members having the same high strength as ingot materials can be produced at low cost.

The above production method is an example in which the carbon concentration in the gas atmosphere in the decarburizing step is lower than the carbon concentration in the gas atmosphere in the carburizing step, whereby a softened layer is formed at the surface layer of the forged sintered member. It should be noted that an atmosphere gas including a large amount of oxygen may be used in the decarburizing step, thereby reducing C which is solid solved in a region from the surface of the cold forged sintered member to the inner portion thereof, and decarburizing and forming a softened layer. In this case, a gas having a low dew point, atmospheric air, or steam atmosphere can be used as the atmosphere gas including a large amount of oxygen.

EXAMPLES

The present invention will be explained in detail hereinafter with reference to plastic examples.

An iron-based alloy powder (average diameter of 70 μm) consisting of 0.5 mass % of Ni, 0.5 mass % of Mo, 0.2 mass % of Mn, the balance of Fe and inevitable impurities was added with 0.3 mass % of a graphite powder and 0.8 part by mass of zinc stearate with the total content of the iron-based alloy powder and the graphite powder as 100 part by mass, and these were mixed and a raw material powder was adjusted.

The raw material powder was weighed at a predetermined weight and filled into a die, and this was compacted at a pressure of 700 MPa. The density of the green compact was 7.0 Mg/m$^3$ and the density ratio was 90%.

The green compacts were charged into a sintering furnace of which atmosphere contained 5 volume % of $H_2$ and 95 volume % of $N_2$ and maintained at a temperature of 1120° C. for 20 minutes, then they were taken out from the sintering furnace. The density of the sintered body was 7.0 Mg/m$^3$ and the density ratio was 90%.

The sintered body was charged into a forging die. Clearance between the sintered body and the die and a core rod was 0.1 mm. The pressure was 1800 MPa and the compressing ratio (compressed thickness/original thickness) was 10%. The density of the gear obtained by the forging was 7.7 Mg/m$^3$ and the density ratio was 97.8%.

The gears obtained by the forging were charged into a heating furnace with a carburizing gas atmosphere and subjected to a carburizing step at temperatures and carbon concentrations in the atmosphere shown in Table 1 for 130 minutes, they were then subjected to a decarburizing step at temperatures and carbon concentrations in the atmosphere shown in Table 1 for 90 minutes, and then they were dipped into an oil, thereby rapidly cooling and quenching them. The carbon concentration in the atmosphere was adjusted by varying the amount of the carburizing gas (propane) added to nitrogen gas as a carrier gas. Then, the gears were subjected to a tempering step at a temperature of 180° C. for 90 minutes, thereby obtaining samples 01 to 06 and 09 to 22. As a conventional example, a gear was subjected to the carburizing step in the conditions shown in Table 1 and the quenching step and the tempering step in the above condition without the decarburizing step, thereby obtaining sample 07. As another conventional example, a gear having the same size as the above gear was machined from an ingot steel and subjected to the carburizing step in the conditions shown in Table 1 and the quenching step and the tempering step in the above conditions without the decarburizing step, thereby obtaining sample 08. Item "Cp value" is the amount of carbon in the atmosphere of the carburizing step and the decarburizing step.

Hardness of portions from the surface to the inner portion of the tooth portion in a cross section taken along a plane surface A perpendicular to a mounting hole of the obtained samples 01 to 22 were measured using a Vickers hardness tester (load of 100 g). The results are shown in Table 1 and FIGS. 5 to 8. The hardness measured at a portion 0 μm from the surface is the hardness measured at the surface.

Load was applied spanning three tooth portions, and the load when the tooth portions were crushed was measured. The result is shown in Table 1. Since crush load may be required to be 3.4 tf or more when the gear is applied to a spur gear of a starter, this value was decided to be a criterion for acceptability.

TABLE 1

| Sample No. | Carburizing step | | Decarburizing step | | Hardness at a point of X μm from the surface Hv | | | | | | | |
| | Cp value | Heating temperature ° C. | Cp value | Heating temperature ° C. | 0 | 20 | 50 | 75 | 100 | 150 | 200 | 250 |
| --- | --- | --- | --- | --- | --- | --- | --- | --- | --- | --- | --- | --- |
| 01 | 0.85 | 920 | 0.2 | 860 | 440 | 445 | 460 | 510 | 530 | 540 | 550 | 550 |
| 02 | 0.85 | 920 | 0.3 | 860 | 500 | 505 | 520 | 570 | 590 | 600 | 600 | 590 |

TABLE 1-continued

| Sample No. | | | | | | | | | | | | |
|---|---|---|---|---|---|---|---|---|---|---|---|---|
| 03 | 0.85 | 920 | 0.4 | 860 | 550 | 555 | 570 | 610 | 630 | 650 | 660 | 650 |
| 04 | 0.85 | 920 | 0.5 | 860 | 600 | 610 | 630 | 680 | 730 | 740 | 750 | 750 |
| 05 | 0.85 | 920 | 0.6 | 860 | 730 | 730 | 740 | 760 | 770 | 780 | 780 | 770 |
| 06 | 0.85 | 920 | 0.7 | 860 | 780 | 780 | 790 | 790 | 780 | 780 | 770 | 760 |
| 07 | 0.85 | 920 | — | — | 820 | 815 | 810 | 800 | 780 | 770 | 750 | 720 |
| 08 | 0.85 | 920 | — | — | 810 | 810 | 805 | 800 | 790 | 780 | 760 | 730 |
| 09 | 0.85 | 920 | 0.5 | 780 | 770 | 780 | 790 | 790 | 780 | 770 | 750 | 720 |
| 10 | 0.85 | 920 | 0.5 | 800 | 700 | 710 | 730 | 740 | 750 | 760 | 750 | 730 |
| 04 | 0.85 | 920 | 0.5 | 860 | 600 | 610 | 630 | 680 | 730 | 740 | 750 | 750 |
| 11 | 0.85 | 920 | 0.5 | 900 | 580 | 585 | 590 | 610 | 630 | 640 | 640 | 630 |
| 12 | 0.85 | 920 | 0.5 | 950 | 560 | 560 | 570 | 580 | 590 | 600 | 610 | 610 |
| 13 | 0.85 | 920 | 0.5 | 1000 | 550 | 550 | 555 | 560 | 570 | 580 | 580 | 580 |
| 14 | 0.6 | 920 | 0.5 | 860 | 520 | 520 | 530 | 540 | 550 | 560 | 570 | 570 |
| 15 | 0.7 | 920 | 0.5 | 860 | 550 | 555 | 570 | 600 | 630 | 640 | 640 | 640 |
| 04 | 0.85 | 920 | 0.5 | 860 | 600 | 610 | 630 | 680 | 730 | 740 | 750 | 750 |
| 16 | 1.0 | 920 | 0.5 | 860 | 650 | 655 | 670 | 730 | 790 | 810 | 820 | 820 |
| 17 | 1.2 | 920 | 0.5 | 860 | 730 | 740 | 750 | 790 | 830 | 860 | 870 | 860 |
| 18 | 1.3 | 920 | 0.5 | 860 | 780 | 790 | 800 | 820 | 860 | 890 | 900 | 890 |
| 19 | 0.85 | 840 | 0.5 | 860 | 550 | 550 | 560 | 570 | 580 | 590 | 590 | 580 |
| 20 | 0.85 | 850 | 0.5 | 860 | 580 | 585 | 595 | 610 | 640 | 650 | 650 | 645 |
| 21 | 0.85 | 900 | 0.5 | 860 | 600 | 610 | 630 | 680 | 720 | 730 | 730 | 730 |
| 04 | 0.85 | 920 | 0.5 | 860 | 600 | 610 | 630 | 680 | 730 | 740 | 750 | 750 |
| 22 | 0.85 | 950 | 0.5 | 860 | 610 | 620 | 640 | 690 | 740 | 750 | 760 | 760 |
| 23 | 0.85 | 1000 | 0.5 | 860 | 620 | 630 | 650 | 700 | 750 | 760 | 770 | 770 |

| Sample No. | Hardness at a point of X μm from the surface Hv | | | | | | | | Crushing load tf | Remark |
|---|---|---|---|---|---|---|---|---|---|---|
| | 300 | 400 | 500 | 750 | 1000 | 1250 | 1500 | 2000 | | |
| 01 | 540 | 500 | 450 | 400 | 330 | 310 | 300 | 300 | 3.2 | Out of the range of the invention |
| 02 | 570 | 530 | 490 | 430 | 330 | 320 | 310 | 310 | 3.8 | |
| 03 | 640 | 610 | 550 | 500 | 450 | 420 | 400 | 400 | 4.0 | |
| 04 | 740 | 730 | 720 | 650 | 590 | 540 | 460 | 460 | 4.2 | |
| 05 | 760 | 740 | 730 | 660 | 620 | 550 | 510 | 500 | 4.0 | |
| 06 | 750 | 750 | 740 | 700 | 650 | 600 | 580 | 550 | 3.1 | Out of the range of the invention |
| 07 | 680 | 640 | 615 | 410 | 360 | 325 | 310 | 310 | 2.9 | Without carburizing step |
| 08 | 690 | 650 | 630 | 420 | 370 | 330 | 320 | 320 | 4.2 | Ingot steel |
| 09 | 680 | 640 | 580 | 430 | 370 | 330 | 320 | 320 | 3.2 | Out of the range of the invention |
| 10 | 710 | 680 | 640 | 500 | 450 | 430 | 410 | 400 | 3.8 | |
| 04 | 740 | 730 | 720 | 650 | 590 | 540 | 460 | 460 | 4.2 | |
| 11 | 620 | 600 | 580 | 560 | 540 | 530 | 510 | 500 | 4.1 | |
| 12 | 600 | 590 | 580 | 560 | 550 | 540 | 530 | 520 | 4.0 | |
| 13 | 580 | 570 | 570 | 560 | 560 | 550 | 550 | 550 | 4.0 | Out of the range of the invention |
| 14 | 560 | 550 | 530 | 510 | 470 | 450 | 440 | 440 | 3.2 | Out of the range of the invention |
| 15 | 630 | 600 | 570 | 530 | 490 | 460 | 440 | 440 | 3.9 | |
| 04 | 740 | 730 | 720 | 650 | 590 | 540 | 460 | 460 | 4.2 | |
| 16 | 800 | 780 | 750 | 680 | 610 | 560 | 490 | 480 | 4.0 | |
| 17 | 850 | 810 | 770 | 700 | 630 | 570 | 500 | 490 | 3.8 | |
| 18 | 880 | 850 | 800 | 720 | 640 | 580 | 520 | 500 | 3.3 | Out of the range of the invention |
| 19 | 570 | 550 | 520 | 490 | 470 | 450 | 430 | 430 | 3.2 | Out of the range of the invention |
| 20 | 625 | 605 | 585 | 540 | 500 | 470 | 440 | 440 | 3.9 | |
| 21 | 720 | 710 | 680 | 620 | 540 | 500 | 450 | 450 | 4.1 | |
| 04 | 740 | 730 | 720 | 650 | 590 | 540 | 460 | 460 | 4.2 | |
| 22 | 750 | 740 | 730 | 680 | 630 | 590 | 550 | 540 | 4.5 | |
| 23 | 760 | 750 | 740 | 720 | 700 | 680 | 650 | 640 | 5.1 | Out of the range of the invention |

Effect of Carbon Concentration in Atmosphere Gas in Decarburizing Step

Figure 5:
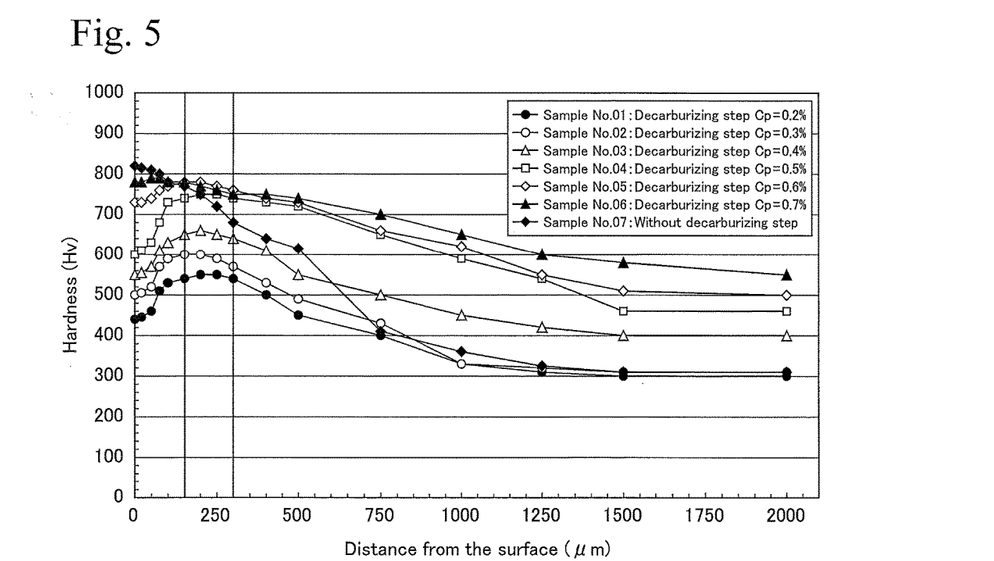
FIG. 5 is a graph showing a variation of hardness at a portion from a surface when carbon concentration in an atmosphere in a decarburizing step of an example is varied.

The effect of the carbon concentration (Cp) in a decarburizing step was investigated based on the results of the samples 01 to 07 in Table 1 and FIG. 5.

In the sample 07 which is a conventional example and was not subjected to the decarburizing step, the hardness of the surface (distance from the surface=0) was the highest at Hv 820 and showed a hardness distribution in which the hardness decreased from the surface to the inner portion. The spanning crushing load of sample 07 having such a hardness distribution was low at 2.9 tf.

On the other hand, in the samples 01 to 06 which were subjected to the decarburizing step, the hardness of the surface (distance from the surface=0) was lower than the hardness of the surface of sample 07, and the hardness of the surface was low as the carbon concentration (Cp value) of the atmosphere gas in the decarburizing step was low. In the samples 02 to 05 in which the carbon concentration of the atmosphere gas in the decarburizing step was 0.3 to 0.6 mass %, the hardness of the surface was Hv 730 or less, and the spanning crushing load was high at 3.8 to 4.2 tf. The spanning crushing load was not inferior to the spanning crushing load of sample 08 made from an ingot steel. This may be because the notch sensitivity of pores remained in the surface was reduced by reducing the hardness of the surface by the decarburizing step. As shown in FIG. 5, in the samples 02 to 05, the hardness was highest in the region of 150 to 300 μm from the surface, and the maximum hardness was Hv 600 or more. Therefore, when the samples are used in a tooth portion of a gear to which repeated surface pressure is applied, these may have sufficient fatigue strength against repeated application of surface pressure.

In the sample 01 in which the carbon concentration in the atmosphere gas in the decarburizing step was less than 0.3 mass %, decarburizing from the surface was extreme, the maximum hardness was decreased at Hv 550, and the spanning crushing load was low at 3.2 tf. It may be because the hardness of the surface was decreased and the effect in which carbon for improving strength was extremely decarburized was large with respect to the effect in which the hardness of the surface was reduced and the notch sensitivity of pores was reduced, whereby the spanning crush load was not sufficiently improved.

In the sample 06 in which the carbon concentration of the atmosphere gas in the decarburizing step was more than 0.6 mass %, the carburizing from the surface was poor, and the hardness of the surface was Hv 780. Therefore, the spanning crushing load was 3.1 tf, and the effect of improving the spanning crushing load by the decarburizing was poor. It may be because the effect of reducing the notch sensitivity of pores remaining in the surface by the decarburizing was poor.

Thus, it was confirmed that the strength of the cold forged sintered member can be improved by having the surface hardness of Hv 730 or more and reducing the notch sensitivity of pores remained in the surface. It was confirmed that the cold forged sintered member had the above surface hardness by adding the decarburizing step and setting the carbon concentration of the atmosphere gas in the decarburizing step in the range of 0.3 to 0.6 mass %.

Effect of Heating Temperature in Decarburizing Step

Figure 6:
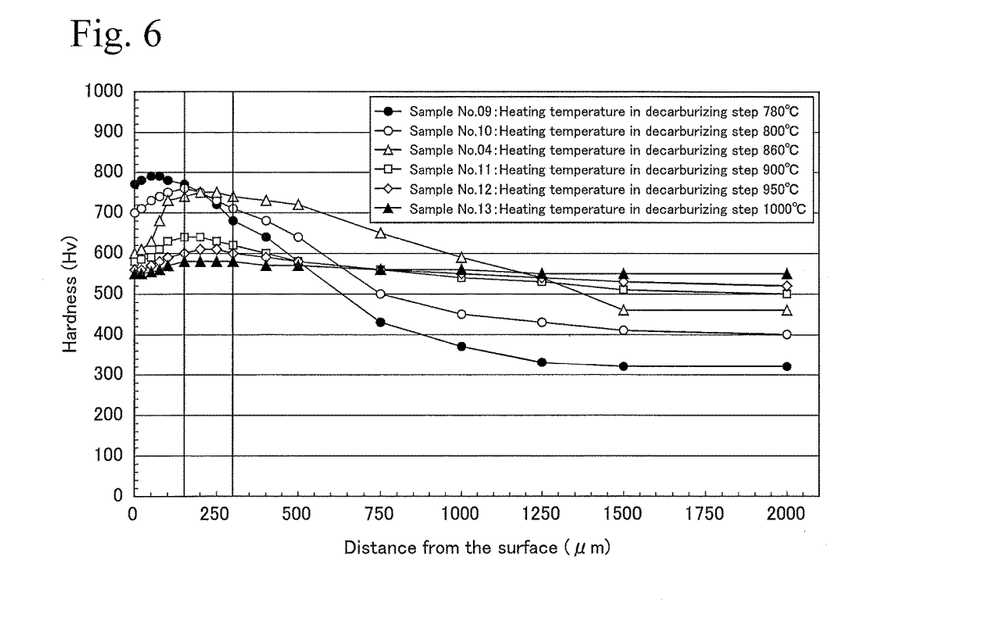
FIG. 6 is a graph showing variation in hardness at a portion from a surface when a heating temperature in the decarburizing step of the example is varied.

The effect of the heating temperature in the decarburizing step was investigated based on the results of the samples 04 and 09 to 13 in Table 1 and FIG. 6.

In the sample of sample 09 in which the heating temperature in the decarburizing step was less than 800° C., decarburizing from the surface was poor, and the surface hardness was Hv 770, whereby the spanning crushing load was 3.2 tf, and the effect of improving the spanning crushing load by the decarburizing was poor. This may be because the effect of reducing the notch sensitivity of pores remaining in the surface by the decarburizing was poor.

On the other hand, in the sample 10 in which the heating temperature in the decarburizing step was 800° C., decarburizing from the surface of the sample was promoted, whereby the surface hardness was reduced to Hv 700, and the spanning crushing load was greatly improved at 3.8 tf. In the samples 04 and 11 to 13, in which the heating temperature in the decarburizing step was 860° C. or more, decarburizing was promoted, whereby the surface hardness was Hv 550 to 600, and the spanning crushing loads were high at 4.0 to 4.2 tf, which was equivalent to the spanning crushing load of sample 08 made from an ingot steel.

As shown in FIG. 6, in samples in which the heating temperatures in the decarburizing step were up to 860° C., the surface hardness was rapidly decreased according to elevation of the heating temperature. When the heating temperature was more than 860° C., the rate of decrease of the surface hardness was small. This is because although decarburizing was promoted as the heating temperature was increased, the Cp value of the atmosphere was 0.5%, whereby the carbon content of the sample surface was not less than 0.5 mass % and balance at approximately 0.5 mass %.

However, in the sample 13 in which the heating temperature was greater than 950° C., the maximum hardness was low at Hv 580. If the sample is used in uses in which repeated surface pressure is applied, the fatigue strength against repeated surface pressure may decrease.

On the other hand, in the samples 04 and 10 to 12 in which the heating temperatures were 800 to 950° C., the hardness was maximum in the region of 150 to 300 μm from the surface, and the maximum hardness was Hv 600 or more. Therefore, when the samples are used in uses in which repeated surface pressure is applied, sufficient fatigue strength against repeated surface pressure may be obtained.

Thus, it was confirmed that the surface hardness is Hv 730 or less, the hardness is maximum in the region of 150 to 300 μm from the surface, and the maximum hardness is Hv 600 or more by setting the heating temperature in the decarburizing step at 800 to 950° C.

Effect of Carbon Concentration in Carburizing Step

Figure 7:
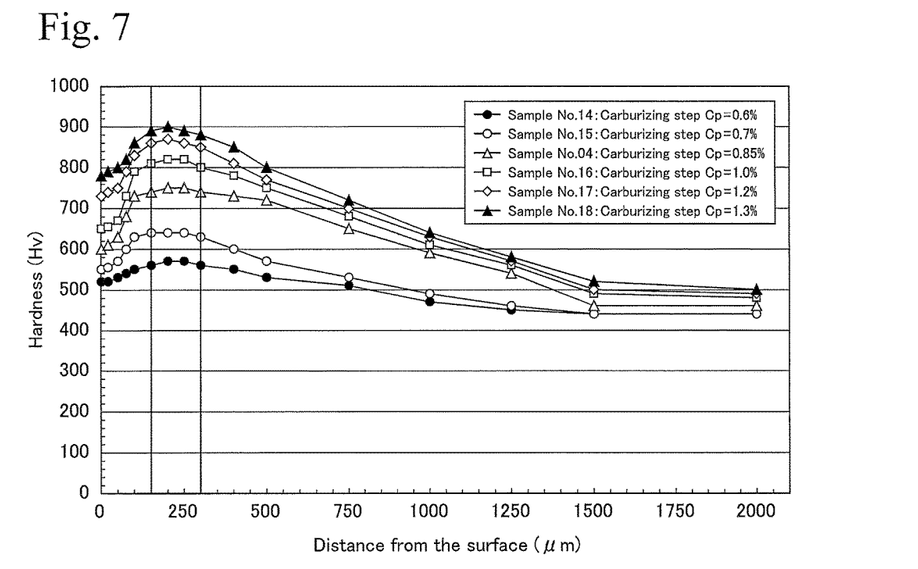
FIG. 7 is a graph showing a variation of hardness at a portion from a surface when carbon concentration in an atmosphere in a carburizing step of the example is varied.

The effect of the carbon concentration (Cp value) in the carburizing step was investigated based on the results of the samples 04 and 14 to 18 in Table 1 and FIG. 7.

In the sample 14 in which the carbon concentration of the atmosphere gas in the carburizing step was 0.6 mass %, since the amount of carburizing was poor, the maximum hardness of the region of 150 to 300 μm from the surface was low at Hv 570 and the spanning crushing load was low at 3.2 tf.

On the other hand, in the samples 04 and 15 to 18, in which the carbon concentration of the atmosphere gas in the carburizing step was 0.7 mass % or more, as shown in FIG. 7, the amount of carburizing was increased as the carbon concentration in the atmosphere gas was increased, and the portion from the surface to the inner portion showed a tendency of increasing the hardness. In the samples 04 and 15 to 17 in which the carbon concentration of the atmosphere gas was 0.7 to 1.2 mass %, the maximum hardness of the region of 150 to 300 μm from the surface was high at Hv 640 to 870, and the spanning crushing load was high at 3.8 to 4.2 tf which was equivalent to the spanning crushing load of sample 08 made from an ingot steel.

However, in the sample 18 in which the carbon concentration of the atmosphere gas was more than 1.2 mass %, the amount of carburizing was excessive and decarburizing was insufficient in the following decarburizing step, whereby the surface hardness was Hv 780, the notch sensitivity of pores remaining at the surface could not sufficiently be reduced, and the spanning crushing load was low at 3.3 tf.

Thus, it was confirmed that high spanning crushing load equivalent to that of an ingot steel could be obtained by setting the carbon concentration of the atmosphere gas in the carburizing step in the range of 0.7 to 1.2 mass %.

Effect of Heating Temperature in Carburizing Step

Figure 8:
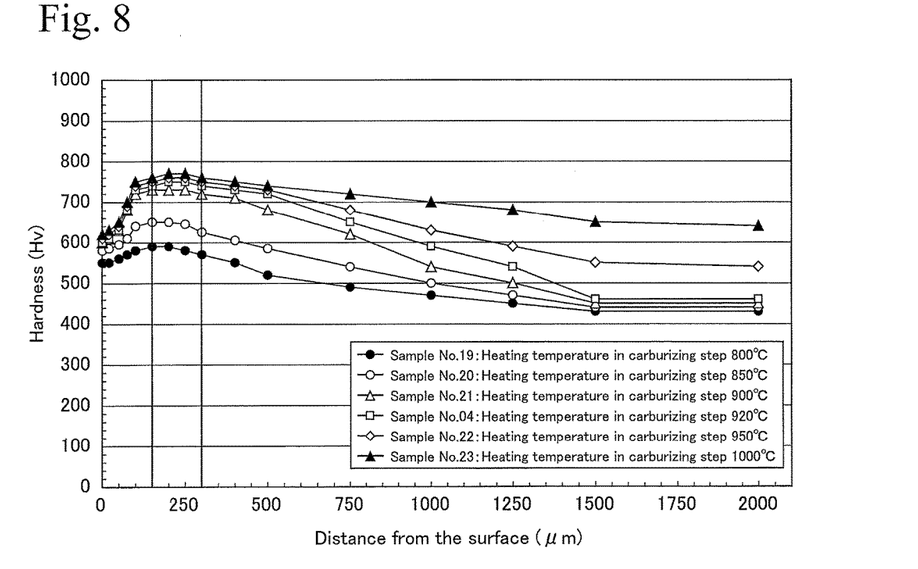

The effect of the heating temperature in the carburizing step was investigated based on the results of the samples 04 and 19 to 23 in Table 1 and FIG. 8.

In the sample 19 in which the heating temperature in the carburizing step was less than 850° C., the amount of carburizing was poor, the maximum hardness in the region of 150 to 300 μm from the surface was low at Hv 590, and the spanning crushing load was low at 3.2 tf.

On the other hand, in the samples 04 and 20 to 23 in which the heating temperature in the carburizing step was 850° C. or more, as shown in FIG. 8, the amount of carburizing was increased as the heating temperature was elevated, and the portion from the surface to the inner portion showed a tendency to increase in hardness. In the samples, the surface hardness was Hv 580 to 620, and the spanning crushing load was high at 3.9 to 5.1 tf equivalent to, or greater than, the spanning crushing load of sample 08 made from an ingot steel.

However, in the sample 23 in which the heating temperature in the carburizing step was greater than 950° C., carburizing proceeded at the inner portion, in which the hardness was high, and toughness thereof may be decreased. Therefore, the sample may not be suitable for uses in which impacts will be applied.

Thus, it was confirmed that high spanning crushing load equivalent to, or greater than, that of an ingot steel could be obtained by setting the heating temperature in the carburizing step in the range of 850 to 950° C. Since the samples of this range were not carburized at the inner portion, the toughness may be high.

The present invention can provide strength equivalent to that of an ingot steel to sintered members, and it is applicable to sintered members such as gears and sprockets to which large stress is applied from counter members, and it is applicable to pinion gears of starters.

The invention claimed is:

1. A sintered member comprising:
    a hardness distribution in which hardness continuously varies from a surface to an inner portion;
    a Vickers hardness value of 730 or less at the surface;
    the maximum hardness of which portion exists in a region of 150 to 300 μm from the surface;
    wherein the maximum hardness is Vickers hardness value of 600 or more,
    a carburized and hardened layer is formed in a surface layer, and a decarburized layer that has a lower carbon concentration than that of the carburized and hardened layer is formed outside the carburized and hardened layer, and the decarburized layer forms the surface.

2. The sintered member according to claim 1, wherein the carburized and hardened layer has a carbon concentration of 0.7 to 1.2 mass % and the decarburized layer has a carbon concentration of 0.3 to 0.6 mass %.

3. A pinion gear made of the sintered member according to claim 1.

4. A production method for a sintered member of claim 1, the method comprising:
    a mixing step for mixing a raw material powder;
    a compacting step for compressing the raw material powder and obtaining a compact;
    a sintering step for sintering the compact and obtaining a sintered body;
    a forging step for forging the sintered body and obtaining a forged body;
    a carburizing step for heating the forged body in a gas atmosphere in which the carbon concentration is 0.7 to 1.2 mass % at a temperature of 850 to 950° C.;
    a decarburizing step for heating the forged body in a carburizing gas atmosphere in which the carbon concentration is 0.3 to 0.6 mass % at a temperature of 800 to 950° C. after the carburizing step;
    a quenching step for rapidly cooling the forged body after the decarburizing step; and
    a tempering step for heating the forged body to a temperature of 150 to 280° C. and cooling the forged body to ordinary temperature after the quenching step.

5. The production method for a sintered member according to claim 4, wherein the decarburizing step is performed sequentially after the carburizing step while heating the forged body and displacing the atmosphere gas.

6. The production method for a sintered member according to claim 4, wherein the quenching is performed by dipping the forged body into an oil immediately after the carburizing step, and the decarburizing step is performed by again heating the forged body.

7. The production method for a sintered member according to claim 4, wherein the forged body has a density ratio of 97.8% or more after the forging step.

8. The production method for a pinion gear for starter produced by the production method for a sintered member according to claim 4.

9. The sintered member according to claim 2, wherein the carbon concentration is maximum at an intermediate portion of the carburized and hardened layer in a depth direction thereof, gradually reduces from the maximum carbon concentration portion toward the decarburized layer, and gradually reduces from the decarburized layer toward the surface.

* * * * *